United States Patent [19]

Magee

[11] Patent Number: 4,750,958
[45] Date of Patent: Jun. 14, 1988

[54] HUB REPLACEMENT METHOD FOR TIRE RETREADING

[75] Inventor: Arthur W. Magee, Richardson, Tex.

[73] Assignee: Long Mile Rubber Company, Dallas, Tex.

[21] Appl. No.: 919,988

[22] Filed: Oct. 17, 1986

Related U.S. Application Data

[62] Division of Ser. No. 835,335, Mar. 3, 1986, Pat. No. 4,662,834.

[51] Int. Cl.⁴ .............................................. B29D 30/56
[52] U.S. Cl. ..................................... 156/96; 156/909
[58] Field of Search ................. 425/11, 14, 17, 22, 425/26, 19-21, 35, 36, 49; 156/95, 96, 127, 128.1, 421.6, 909

[56] References Cited

U.S. PATENT DOCUMENTS

| | | | |
|---|---|---|---|
| 1,788,428 | 1/1931 | Garabiol | 425/28 R |
| 1,801,759 | 4/1931 | Steinle | 156/131 |
| 3,038,204 | 6/1962 | Van Scoyk | 425/14 |
| 3,752,726 | 4/1971 | Barefoot | 156/96 |
| 3,853,666 | 12/1974 | Barefoot | 156/128.1 X |
| 3,880,556 | 4/1975 | Brown et al. | 425/11 |
| 4,153,497 | 5/1979 | Budrioli | 156/909 X |
| 4,274,897 | 6/1981 | Barefoot | 156/96 |
| 4,299,647 | 11/1981 | DeHaven | 425/17 |
| 4,600,467 | 7/1986 | Perdue | 425/14 |
| 4,624,732 | 11/1986 | King | 156/96 X |

Primary Examiner—Michael Ball
Assistant Examiner—Geoffrey L. Knable
Attorney, Agent, or Firm—Jerry W. Mills; Roger N. Chauza

[57] ABSTRACT

Disclosed is a hub replacement device for use in vehicle tire retreading processes. An envelope (30) is sealed against the tire carcass sidewalls (22, 24) to provide an environmental seal of the new tread (54) on the carcass crown (50) during the vulcanization process. Three arcuate rigid plates (16, 18, 20), each with a pair of ribs (56, 58), are installed between the carcass beads (12, 14), for supporting the beads (12, 14), a predetermined distance apart along a majority of the bead circumference. Integral with each support plate (16, 18, 20) are pairs of opposing toggle clamps (32, 40) with hooked ends (36). A pair of annular discs (26, 28) are located on each side of the tire for applying a compressive force on the envelope (30) against the carcass sidewalls (22, 24). The annular discs (26, 28) are each equipped with pairs of anchor loops (42, 44) to which the hooked ends (36) of the toggle clamps (32, 40) are releasably engaged.

7 Claims, 2 Drawing Sheets

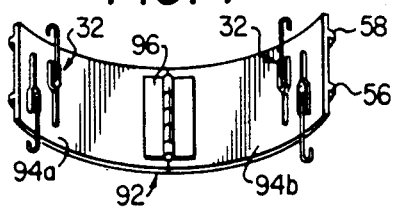
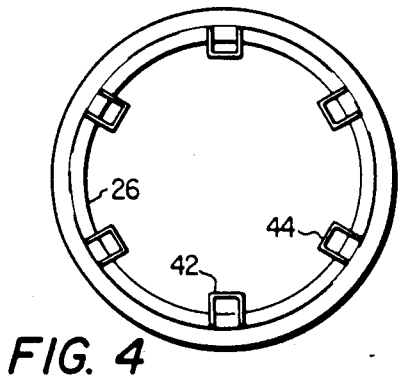
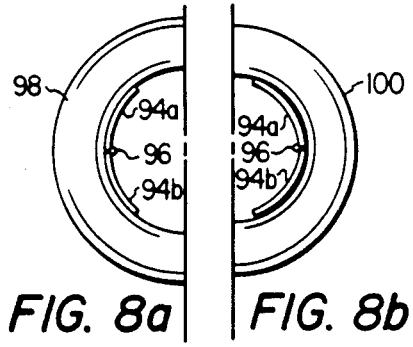
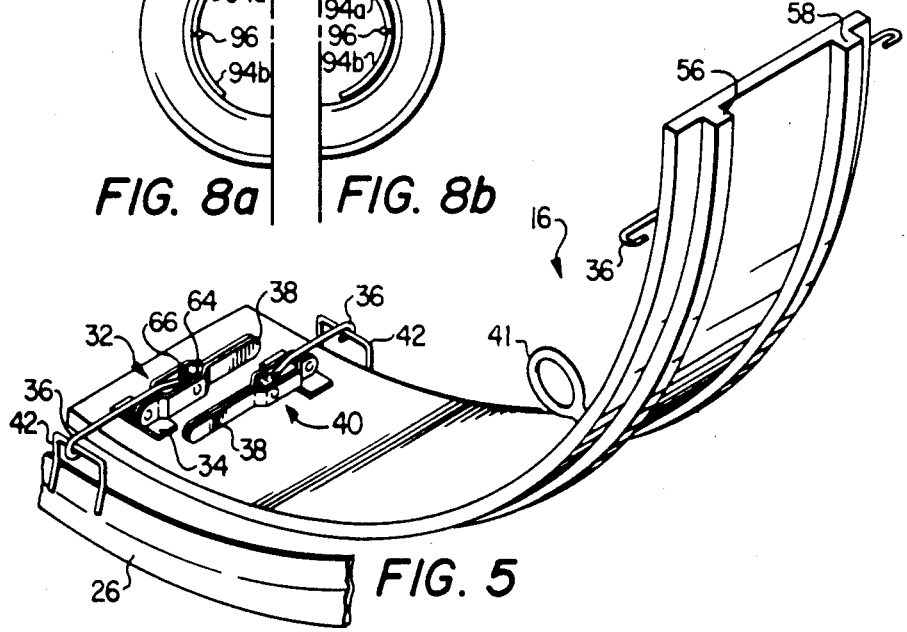
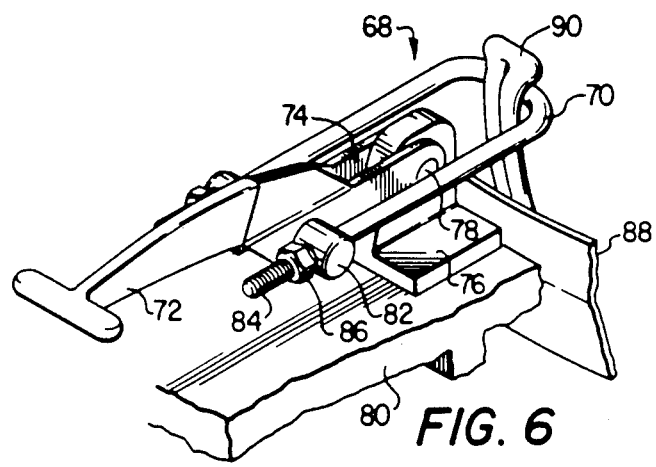

HUB REPLACEMENT METHOD FOR TIRE RETREADING

RELATED APPLICATIONS

This is a divisional of application Ser. No. 835,335, filed Mar. 3, 1986 and entitled "HUB REPLACEMENT DEVICE FOR TIRE RETREADING APPARATUS", now U.S. Pat. No. 4,662,834.

TECHNICAL FIELD

The present invention relates in general to methods and apparatus for retreading used vehicle tires, and more particularly relates to retreading techniques employing a sealing envelope for sealing the retread portion of the tire from the environment during the vulcanizing process.

BACKGROUND OF THE INVENTION

The tire retreading industry has become a highly competitive field for producing vehicle tires using old carcasses with new treads vulcanized thereto. The success in this field dictates that with the current labor intensive retreading techniques, the rejects or defective recapped tires be maintained at an absolute minimum. This is important both from a standpoint of profit margin, as well as liability.

One current technique utilized throughout the major portion of the industry is to apply a new tread to an old carcass which has had the old tread removed, such as by buffing or other abrasive means. After the removal of the old tread, a layer of uncured raw rubber is applied over the crown of the carcass. The new retread is then stretched over the rubber layer and adjusted on the crown of the tire to assure proper alignment with the carcass. A sealing envelope is placed around the recapped portion of the carcass and held against the tire sidewalls to seal the new retread from the moisture of the vulcanizing environment. Air is then evacuated from between the tire and the sealed envelope.

The tire carcass and new tread are then vulcanized to each other in a high pressure and high temperature atmosphere. In many cases, steam is used to accelerate the vulcanizing process. In order to assure that air pockets or moisture do not form between the carcass and the new tread, it is imperative that the envelope be sealed against the carcass sidewalls during the entire vulcanizing process.

Many techniques have been developed in an attempt to assure that a reliable seal is maintained between the envelope and tire carcass. For example, disclosed in U.S. Pat. No. 4,274,897 is a pair of wire grids or grills disposed on each side of the tire carcass for pressing the envelope edges against the carcass sidewalls. Coil springs with hooked ends are used to pull the grills together, thereby compressing the grills and the envelope against tire sidewall. Disclosed also is the auxiliary use of three or four small spacers for spacing the tire beads apart. With the mechanism disclosed in the noted patent, the sealing ability of the grills are dependent in a large part on the stiffness of the tire carcass and its ability to resist compressive forces.

U.S. Pat. No. 4,153,497 discloses a tire retreading apparatus with two annular rings which press the envelope against tire sidewalls. The rings are maintained a predetermined distance apart. Four hooked bolts are engageable both with a spider assembly and with the tire beads at four corresponding points. The hooked bolts pull the tire beads outwardly and thus force the sidewalls against the annular rings. The envelope is thus sealed against the tire sidewalls. With this apparatus, the application of a compressive force to the sidewalls is made using only four points along the tire beads. This approach presents the possibility of permanently bending the tire bead if the hooked bolts are tightened excessively. Again, the assurance of a good seal depends on the stiffness of the tire beads as well as the stiffness of the tire sidewalls.

With the increased use of radial tires having resilient sidewalls, it may be seen that a need has arisen for an improved tire retreading apparatus which provides a better compressive force that is uniform along the entire circumference of the sidewalls, and which is more independent of the stiffness of the tire sidewalls. There is an associated need for retreading apparatus having a hub-type support for the tire carcass during the retreading process, without the inconvenience of positioning a tube inside the carcass and installing the tire carcass on a rimmed hub structure.

SUMMARY OF THE INVENTION

The present invention comprises an improved tire retreading apparatus which overcomes or substantially reduces the shortcomings of the prior retreading devices.

In accordance with the invention, there is provided a plurality of rigid support plates positioned about the inside of the tire between the opening defined by the beads. The support plates support the tire carcass beads in a spaced-apart relationship much like the rim of a vehicle hub. Each plate is equipped with two ribs for engaging the tire beads and maintaining them a predetermined distance apart.

A pair of annular discs operate in conjunction with the support plates for maintaining a uniform compressive force on the sidewalls of the tire carcass. In the preferred embodiment of the invention, the annular discs are provided with a plurality of anchor loops. Attached to the support plates are a corresponding plurality of toggle clamps with hooked ends engageable with the anchor loops of each of the annular discs. When the toggle clamps are actuated, each annular disc is pulled axially inwardly, thereby compressing the sealing envelope against the carcass sidewalls.

Because the tire beads are maintained in a rigid spaced-apart relationship by the support plates, a rigid base is provided for clamping the annular discs into compression with the support plates. With the support plate structure positioned between the beads of the tire carcass, each annular disc can be held in compression against its associated sidewall, independently of the other annular disc. As a result, a uniform compressive force is maintained around the circumference of each annular disc, thus assuring a reliable seal between the envelope and both tire sidewalls.

In another embodiment of the invention, a pair of annular discs are provided with plural anchor hooks, while the toggle clamps, mounted on the support plates, include loops engageable with the anchor hooks. In both embodiments, the toggle clamps are made adjustable to vary the compressive force applied to the annular discs. Also, each rigid support plate can be made in halves, and hinged together for adapting the invention to tire carcasses of various sizes.

BRIEF DESCRIPTION OF THE DRAWINGS

Other features and advantages of the invention will become apparent in the following description, when read in conjunction with the drawings, in which;

FIG. 4 is a front elevational view of one embodiment of an annular disc;

FIG. 5 is an isometric view of one embodiment of a support plate according to the invention, with attached toggle clamps engaging an annular disc;

FIG. 6 illustrates another embodiment of the toggle clamps;

FIG. 7 illustrates a support plate hinged at an intermediate location; and

FIGS. 8a and 8b show the hinged support plates adapted for use in tire carcasses of different sizes.

DETAILED DESCRIPTION OF THE INVENTION

Figure 1:
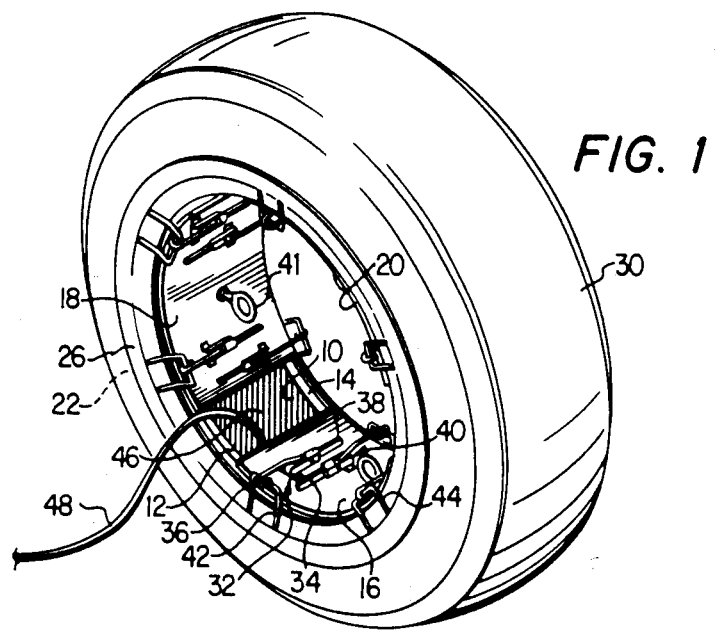
FIG. 1 is an isometric view of the tire retreading apparatus, shown in use with a sealing envelope, as fully applied to a tire carcass.

The understanding of the invention is best facilitated by referring first to FIG. 1 of the drawings. Partially shown is a tire carcass 10 with a pair of beads 12 and 14 supported a predetermined distance apart by three separate support plates 16, 18, and 20. The particular structure by which the support plates 16-20 engage the beads 12 and 14 will be discused in more detail below. Located adjacent the carcass sidewalls 22 and 24 (one of which is shown in FIG. 1) are a corresponding pair of annular discs 26 and 28. Sandwiched between each annular disc 26 and 28, and the corresponding carcass sidewall 22 and 24, is an edge of a conventional sealing envelope 30. Compressive forces which are exerted between the annular discs 26 and 28 perfect a seal of the envelope 30 to the carcass sidewalls 22 and 24. The moisture and air pressure attendant with the vulcanizing process is thereby isolated form the curing surfaces of the retread and crown of the carcass covered by the envelope 30. As is known in the art, an aspirating tube (not shown) is normally connected to the sealing envelope 30 to aspirate any entrapped air from between the envelope and carcass 10.

Mounted to each support plate 16-20 are a number of toggle clamps, such as shown by reference character 32. In the embodiment shown in FIG. 1, each toggle clamp 32 includes a base bracket 34 welded to a support plate 16. The toggle clamp 32 further includes a hooked end 36 which is actuable by a lever 38. The lever 38 is mounted for pivotally moving the hooked end 36 in an axial direction. The level 38 operates in an "over center" fashion to latch the hooked end 36 in a locked position. An oppositely directed toggle clamp 40 is comparably constructed, and is mounted to the support plate 16 for engagement with the oppositely located annular disc 28. Each support plate 16-20 further includes an eye bolt 41 fixed centrally thereto. The eye bolt 41 facilitates handling of the tire during the retreading process, and also storing of the plates when not in use. Quick release fasteners other than the toggle clamp arrangement can be used to compressively clamp the annular discs to the support plates.

In accordance with the preferred form of the invention, each annular disc 26 and 28 includes pairs of anchor loops 42 and 44. Each anchor loop 42 and 44 is welded to a respective annular disc 26 to provide an integral structure. The number of anchor loops 42 and 44 on each annular disc 26 or 28 correspond to the number and placement of toggle clamps 32 disposed in the same direction. As noted in FIG. 1, the anchor loops 42 and 44 are equidistantly spaced around the annular disc 26 and 28 so that when engaged with the various clamps on the support plates 16-20, the carcass beads 12 and 14 are supported at a predetermined distance apart about a majority of the circumferential area of the beads. Significantly, it is noted that while the combined function of each support plate 16-20 provides a rigid support for the beads, tantamount to that of a vehicle rim, each support plate 16-20 is separately installed into engagement with the beads. The present invention is thus easier to handle and store than a conventional hub, but provides support to the tire in the manner of a hub.

The entire central hub area of the carcass 10 is free of structure, thereby allowing the retread apparatus and tire to be easily handled. Also, a small space at 46 exists between each support plate 16-20 for allowing the vulcanizing atmosphere to circulate around the inside surface or cavity of the carcass 10. The permeation of hot air therethrough facilitates the vulcanization of the new tread to the old carcass 10. In those situations where steam is used as a heating agent during vulcanization, a tube 48 can be inserted into the carcass cavity through the space 46. Undesirable condensed moisture thus is forced from the bottom of the carcass and out tube 48 by the internal pressure of the steam chamber.

Further noted in FIG. 1, each annular disc 26 and 28 is not a flat disc, but rather is slightly contoured inwardly at its inside edge. With this construction, the annular discs 26 and 28 conform to the general configuration of tire sidewalls, which are also angled slightly inwardly. The conformance of the annular discs 26 and 28 with the shape of the tire carcass 10 descreases the possibility of an inadequate seal between the envelope 30 and the carcass sidewalls 22 and 24. In order to compensate for the contoured nature of the annular discs 26 and 28, the anchor loops 42 and 44 are bent slightly outwardly.

The annular discs 26 and 28 are preferably constructed of a rigid and stiff material, such as steel. A heavy gauge metal provides sufficient strength and rigidity to prevent twisting when an axial force is applied to the anchor loops 42 and 44 by the corresponding toggle clamps 32. Thus, when the toggle clamps apply an axial force to the respective anchor loops 42 and 44, the entire annular discs 26 and 28 are compressed against the carcass sidewall 22. The anchor loops 42 and 44 are constructed of quarter inch steel rod stock welded to the annular discs 26 and 28.

Figure 2:
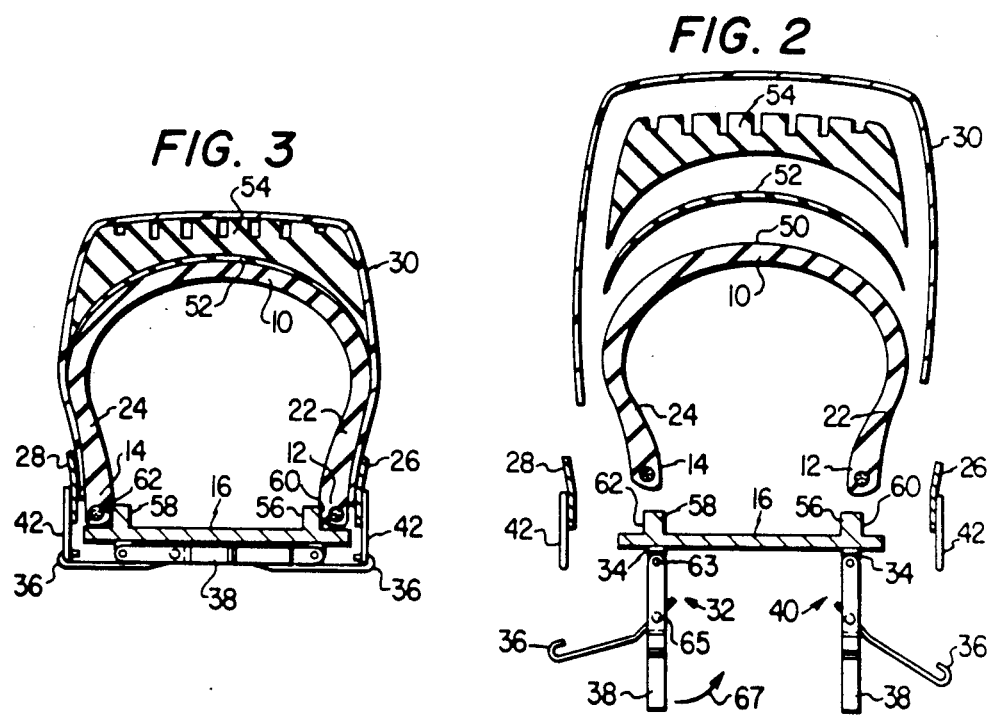
FIG. 2 is a cross-sectional view of the retreading apparatus, as applied to a tire carcass, all shown in exploded form.

With regard to FIG. 2, there is shown in exploded form the retreading apparatus, along with the components of the tire to be recapped. Clearly shown is the inwardly angled nature of the annular discs 26 and 28, and the slightly outwardly angled anchor loops 42. The tire carcass 10 is shown as it appears in its relaxed state, with the beads 12 and 14 disposed slightly axially inwardly. The carcass 10 is shown with its crown surface 50 buffed and prepared for receiving a sheet of raw rubber material 52. A new tire tread 54 is shown disposed over the sheet of raw rubber 52. Sealing envelope 30 covers the retread 54, the sheet 52 of raw rubber and a portion of the sidewalls 22 and 24. The sealing envelope 30 is of conventional design, and is of sufficient girth so as to fit adjacent the carcass sidewalls 22 and 24. In this manner, the annular discs 26 and 28 apply a compressive force to the sealing envelope 30 to thereby insure a positive seal thereof to the carcass sidewalls 22 and 24.

In accordance with another feature of the invention, each support plate 16-20 is provided with a pair of ribs 56 and 58 spaced apart a distance somewhat wider than that of the relaxed carcass beads 12 and 14. The ribs 56 and 58 are orthogonal to the support plates 16-20, thus forming inside corners 60 and 62 for receiving therein the respective beads 12 and 14.

The toggle clamps 32 and 40 are of conventional construction, having a lever 38 pivotal with respect to a base 34 about a first pin 63. The hooked end 36 is pivotal at a central location on the handle 38 about a second pin 65. When the hooked end 36 of the toggle clamp 32 is engaged about anchor loop 42 of annular disc 28, and the handle swung in the direction of arrow 67, the annular disc 28 is pulled toward the stationary support plate 16 base. The toggle clamp 32 is locked into position in an over center manner when the end of the handle 38 is snapped against the surface of the support plate 16. Toggle clamps 40 operate in an identical manner to apply a compressive force by annular disc 26 against carcass sidewall 22. Moreover, the engagement of support plates 18 and 20 with annular discs 26 and 28 are accomplished in a similar manner.

Figure 3:
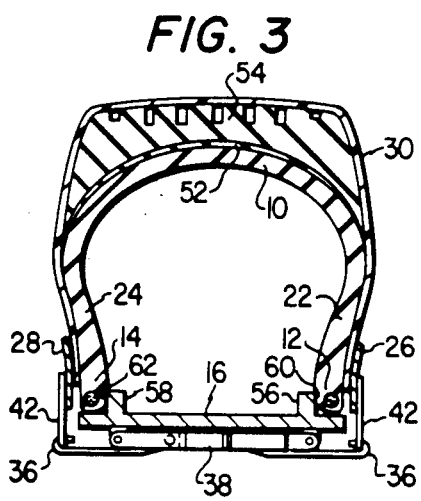
FIG. 3 is a cross-sectional view of the invention, similar to that of FIG. 2, illustrating the toggle clamp engagement with the annular discs to effect a seal of the envelope against the tire sidewalls.

FIG. 3 illustrates the retreading apparatus fully engaged with a recapped tire, ready for vulcanization. As noted in FIG. 3, the axial and radial inside circumferential surfaces of the carcass beads 12 and 14 have been separated slightly and engaged within the inside corners 60 and 62 formed by the ribs 56 and 58 and the support plate 16. All three support plates 16-20 are spaced apart from each other and similarly engaged with the carcass beads 12 and 14.

The installation of the retreading apparatus in preparation for the vulcanizing process is performed as described below. One of the support plates 16 is snapped into engagement between the ribs 12 and 14 of the carcass 10. The hooked ends 36 of those toggle clamps 40 which are directed toward one side of the support plate 16 are engaged with the respective anchor hooks 42 of one annular disc 26. The toggle clamp handles 38 are pressed over center, thus locking the pair of toggle clamps 40 and compressing that part of the annular disc 26 toward the support plate 16. The second and third support plates 18 and 20 are comparably engaged with the carcass 10 and clamped to the remaining anchor loops 42 of the annular disc 26 to provide a complete circumferential force around one edge of the envelope 30. The envelope 30 is thereby sealed against the carcass sidewall 22. It is to be noted that with the attachment of one annular disc 26 to the support plates 16-20, all three such plates 16-20 are maintained in fixed positions radially outwardly and in engagement with the beads 12 and 14. The support plates 16-20 do not fall out of the carcass 10, even if the tire is rolled or moved about.

Next, the other annular disc 28 is held against the carcass sidewall 24 sandwiching the other edge of the envelope 30 therebetween. The hooked ends 36 of the remaining oppositely directed toggle clamps 32 on all support plates 16-20 are engaged with the anchor loops 42 of annular disc 28. When the handles 38 of toggle clamps 32 are pressed over center, the annular disc 28 effects a complete seal of the envelope 30 to the carcass sidewall 24. The entire retread 54 and a portion of the carcass sidewalls 22 and 24 are thereby sealed from the moisture and pressure of the vulcanizing atmosphere.

From the foregoing, it should be understood that the extent of the compressive force applied by one annular disc 26 is generally independent of the compressive force exerted on the other annular disc 28. By this it is meant that the compressive force exerted by annular disc 26 on sidewall 22 is counteracted by two forces. First, the engagement of the bead 12 within the inside corner 60 of the support plate 16 prevents deformation of the bead, and thus provides the major resistance to the compressive force of the annular disc 26. Secondly, and to a lesser degree, the natural stiffness of the crown 50 of the carcass 10, together with that of the new retread 54, tends to prevent the collapsing of the tire due to the compression of annular disc 26. Because the toggle clamps 32 and 40 are mounted integral with the support plates 16-20, one annular disc 26 can be installed and fully compressed without the corresponding installation of the second annular disc 28. In addition, and in contrast with prior retreading equipment, there is no tendency for the beads 12 and 14 to be pushed inwardly during compression of the annular discs 26 and 28.

FIGS. 4 and 5 respectively illustrate different views of the annular disc 26 and support plate 16. The annular disc 26 is circular shaped, corresponding to the general circumference of the sidewall of the carcass 10 to be recapped. Discs suitable for use with the present invention are obtainable from Branick Mfg., Inc., 2600-3rd Avenue North, Fargo, N.D. Spaced around the annular disc 26, and welded thereto, are the pairs of anchor loops 42 and 44. Annular disc 28 is comparably constructed.

The support plate 16 is curved in accordance with the curvature of the tire beads 12 and 14. Each rib 56 and 58 extends along the entire outside surface of the curved support plate 16, and is welded thereto for providing an integral structure. Further shown in FIG. 5 is the adjustable nature of each toggle clamps 32 and 40. Another pair of toggle clamps is provided on support plate 16, but because of the curved nature of the plate, is not shown in FIG. 5. Each hooked end 36 is provided with a threaded part 64 and an adjusting nut 66 for lengthening or shortening the amount by which the hooked end 36 extends away from the base bracket 34. Each toggle clamp can thus be adjusted to provide a uniform clamping force around each of the respective annular discs 26 and 28 to the respective carcass sidewall 22 and 24. Toggle clamps of the noted construction are obtainable from DE-STA-CO, a division of Dover Corporation, Troy, Mich. The toggle clamps 32 and 40 are identified as Model 351.

FIG. 6 illustrates an alternative arrangement for engaging the support plates to the annular discs. Particularly, the toggle clamp 68 includes a loop 70 which is axially movable in response to the pivotal action of the lever 72. Lever 72 includes a bifurcated end 74 mounted to a base bracket 76 by a hinge pin 78. The base bracket 76 is welded or riveted to the support plate 80. The loop 70 is anchored to the lever 72 by a pin 82. The ends 84 of the loop 70 are threaded for receiving an adjustment nut 86. The other free end of loop 70 is comparably constructed. The location of the adjustment nut 86 determines the compressive force applied by the hook 70 to the annular disc 88. In this embodiment, the annular disc 88 is provided with hooks 90 for engaging with the loops 70 of the toggle clamp 68. In all other respects, the embodiment of FIG. 6 operates in a manner substantially identical to that of the toggle clamps described above.

Prior to subjecting the recapped tire to the vulcanization process, and before one annular disc is fully compressed, the aspirating tube (not shown) is connected to the envelope 30 to evacuate the air trapped therein. This further ensures that air pockets will not be formed under the retread and create a potentially defective tire. As noted above, a second tube can be connected to an aspirator to evacuate condensed fluid in the cavity of the tire. The support plates 16-20 do not fully enclose the cavity of the tire carcass 10, but rather provide openings for both the circulation of hot air and the placement of the condensation evacuation tube therein. When placed in an autoclave or similar device to cure and vulcanize the new tread 54 to the carcass 10, the curing time is reduced by allowing the free circulation of hot air or steam throughout the cavity of the tire. This can be appreciated as the temperature of the new tread 54 and carcass 10 is quickly elevated due to the presence of hot air on the envelope side of the tire, as well as in the cavity of the tire.

The support plates of the invention can be hinged, as shown in FIG. 7, to accommodate tire carcasses of various sizes. The hinged support plate 92, is constructed by cutting or forming a support plate, such as described above, into two pieces 94A and 94B, and fastening the parts together by a conventional hinge 96. The hinge 96 can be fixed to the support plate parts 94A and 94B, such as by rivets, bolts or welding. The hinge 96 is fixed to the curved inside surface of the support plate halves 94A and 94B so that when hinged, the curvature of the support plate 92 is made smaller. In this manner, the hinged support plate 92 can be fitted within the beads of a smaller tire carcass.

The hinging feature of the support plate 92 does not detract from the rigidness required for the support of the carcass beads, as each individual support plate half 94A and 94B provides rigid support of the beads along a substantial portion of the bead surface. A plurality of hinged support plates 92 can be engaged with the carcass beads, as described above, to provide an improved envelope seal to carcasses of different sizes. As noted in FIG. 7, the hinged support plate 92 includes a number of toggle clamps 32, and the spaced apart ribs 56 and 58.

FIG. 8A illustrates one hinged support plate 92 applied to a large diameter tire carcass 98. It can be seen that when the support plate halves 94A and 94B are hinged completely apart, the edges of the support plates adjacent the hinge abut and prevent further opening of the hinged support plate 92.

In FIG. 8B the hinged support plate 92 is applied to a smaller diameter tire carcass 100. With each support plate half 94A and 94B rotated together a small amount, the same hinged support plate 92 can be used for varying sizes of tire carcasses. In applying a hinged support plate 92 to a tire carcass, the ribs 56 and 58 of one support plate half 94A are applied between the beads of the tire carcass, and then the other support plate half 94B is hinged outwardly and the respective ribs thereof are engaged with the beads of the tire carcass. Other hinged support plates are then similarly engaged between the tire carcass beads to provide bead support around a majority of the circumferential bead area.

From the foregoing, it can be seen that an improved retreading apparatus is provided. The retreading apparatus according to the invention comprises a plurality of support plates, hinged or nonhinged, which are engageable with the carcass beads for rigidly fixing such beads therearound a predetermined distance apart. The support plates include a pair of ribs for supporting the carcass beads much like that of the rim of a vehicle hub. The support plates are spaced apart from each other to allow the free circulation of vulcanizing air throughout the cavity of the carcass. Provided also are a pair of annular discs for compressing the edges of the sealing envelope against the respective sidewalls of the carcass. Each annular disc includes anchor loops, and the support plates include toggle clamps with hooked ends engageable with the anchor loops. In this manner each annular disc is independently compressible against a respective sidewall of the tire to perfect the seal of the envelope thereto.

The present invention has been described with respect to specific embodiments thereof. However, it should be understood that various changes and modifications can be made by those skilled in the art which fall within the scope of the appended claims.

What is claimed is:

1. A method for applying a tire retreading apparatus to a tire carcass having circumferential beads, so that a sealing envelope can be firmly sealed against sidewalls of the carcass to thereby provide an environmental seal of a new tread to a used carcass during a vulcanization process, comprising the steps of:
   rigidly supporting a majority of each said circumferential bead of the tire carcass axially apart by engaging a majority of the circumferential extent of both the axial and radial inside circumferential surfaces of said circumferential bead a rigid structure which extends between the circumferential beads rigidly fix each said bead with respect to each other; and
   placing a sealing envelope around the tire carcass; and
   applying a compressive force to the envelope to seal the envelope against each sidewall of the tire carcass, and using the rigidly fixed beads for resistance to deformation due to the compressive force.

2. The retreading method of claim 1 further including applying said compressive force so that said compressive force on one sidewall is independent of the compressive force applied on the other sidewall.

3. The retreading method of claim 1 wherein said supporting is carried out using a plurality of plates which engage each said bead on an axial inside surface thereof.

4. The retreading method of claim 3 further including utilizing the plates as an anchor structure for applying the compressive force to the sealing envelope.

5. A method for applying a tire retreading apparatus to a tire carcass having circumferential beads so that a sealing envelope can be sealed against a sidewall of the carcass to thereby provide an environmental seal of a new tread to a used carcass during a vulcanization process, comprising the steps of:
   rigidly supporting a majority of each said circumferential bead of the tire carcass to effect an axial separation thereof and to rigidly fix each said bead with respect to each other by the use of not more than three rigid planar curved support spacers which are removable and extend between said beads; and which together engage a majority of the circumferential extent of the axial and radial inside circumferential surfaces of said circumferential bead; and placing a sealing envelope around the tire carcass; and applying a compressive force to the envelope to seal the envelope against each circumferential sidewall of the tire carcass, and using the rigidly fixed beads for resistance to deformation due to the compressive force.

6. The method of claim 5 wherein said compressive force is applied to said envelope by applying an annular disc adjacent opposing sidewalls of the tire, with the envelope therebetween, and pulling said discs together using said rigid planar curved supported spacers as an anchor.

7. The method of claim 6 further including pulling said annular discs together by using a plurality of toggle clamps anchored to said rigid planar curved supported spacers.

* * * * *